UNITED STATES PATENT OFFICE.

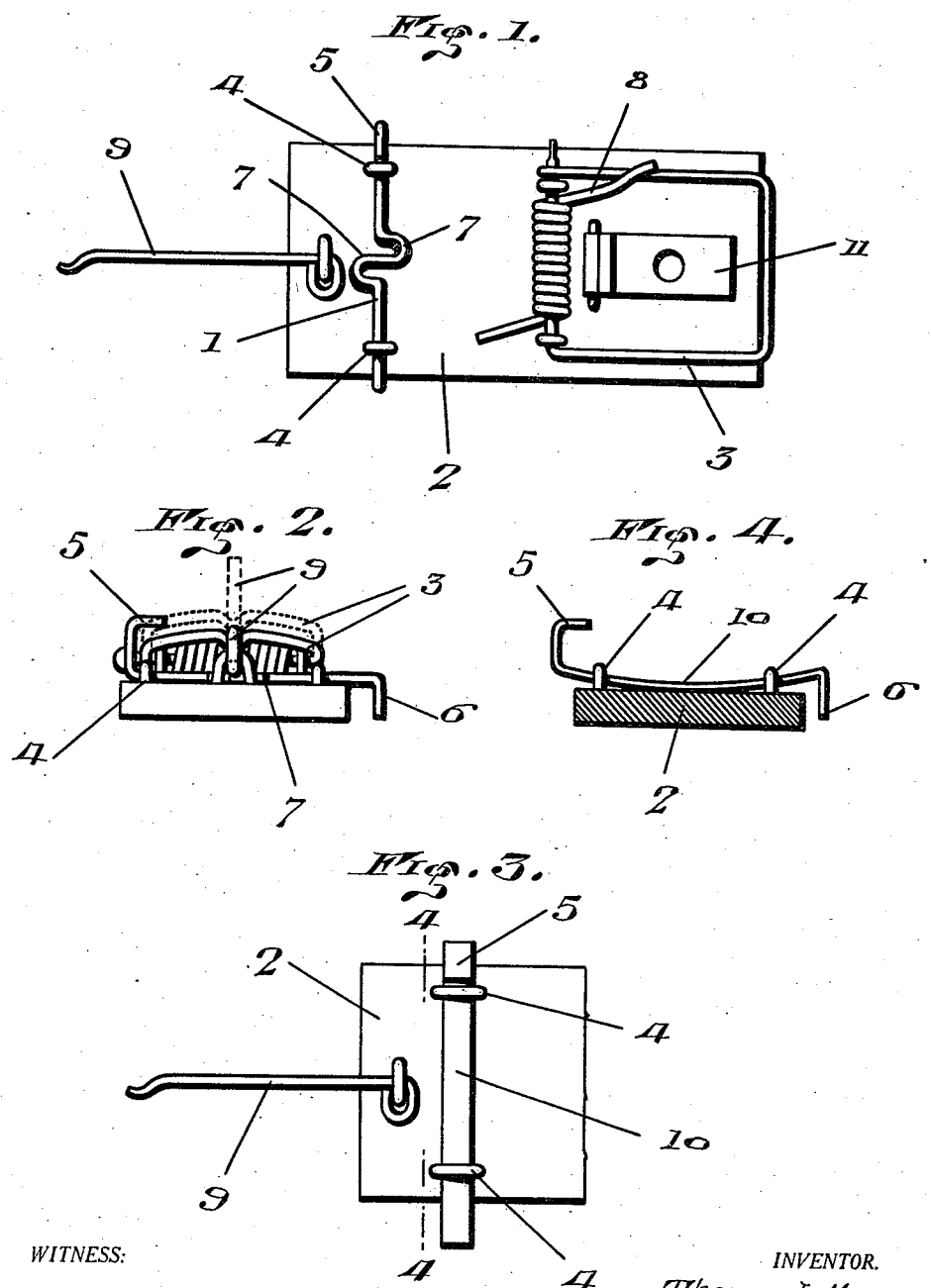

THOMAS LAURENCE MUNROE, OF FALL RIVER, MASSACHUSETTS.

TRAP CATCH.

1,416,737.  Specification of Letters Patent.  Patented May 23, 1922.

Application filed October 14, 1919. Serial No. 330,635.

*To all whom it may concern:*

Be it known that I, THOMAS LAURENCE MUNROE, a citizen of the United States, residing at Fall River, in the county of Bristol and State of Massachusetts, have invented certain new and useful Improvements in Trap Catches, of which the following is a specification.

The present invention relates to trap catches and similar devices adapted to prevent the full operative movement of a movable member of a trap while it is being set, to prevent injury to the user. Heretofore in spring operated traps, and more particularly traps of the impalement and jaw types, a removable U-shaped clip or somewhat similar means has been used adapted to be slipped over and embrace two arms extending one above the other from the trap jaws. However, such known devices involve a specially formed and specially mounted setting or trigger lever co-operating in a special way with the jaw arms and the clip must embrace both jaw arms and this special lever. Furthermore, the clip is merely slipped into place and held entirely by friction. There is nothing to hold it securely against accidental disengagement, and, when disengaged, it is entirely separate from the trap and very easily misplaced or lost. Also, in such previous devices no provision is made against operation when the trigger or analogous means is released. With them, the instant the trigger is freed the jaw or other member is forcibly impelled to full operative position, with possible serious injury to the person attempting to set the trap.

Again, such previous devices are never ready or in preliminary position for use except when actually applied and in full operation. The main objects of the invention are to overcome these and other defects and provide a device of this character which will act as a safety means or protection at all times, whether the trap is set or released, and to so form and mount the catch that that portion thereof which projects into the path of travel of the jaw or other movable part is in a plane at an interval from said movable part, for instance the jaw, and substantially parallel to the plane of the jaw in order that when the jaw is set it will not engage said portion, but will lie at an interval therefrom, the space between the said jaw and the said portion being so great as to be readily apparent at a glance, and the fact that there is an interval between said jaw and said portion is to be taken as a positive visual indication that the trap is set and the trigger mechanism is in proper engagement, whereas without such an interval it will be immediately obvious that the trap is not set. Further objects are to provide such a device which will at all times be in a preliminary position or position to be quickly and easily moved to operative engagement and then held against accidental disengagement or release. Another object is to provide such a device of simple construction and inexpensive manufacture.

For purposes of illustration, the invention has been shown in the drawings as applied to the simplest form of household mouse trap of the impalement type, though it is obvious that without substantial change, it could be equally well applied to much larger traps of the same type, jaw-type traps, traps of the wire-choker type, and others.

In the drawings:

Fig. 1 is a top plan view, with trap unset.

Fig. 2 is an end view, with trap set.

Fig. 3 is a top plan view of the trap end, showing the form of catch of Fig. 4, and Fig. 4 is a cross section, showing side elevation of modified form of catch.

In this application the invention is shown and described as applied to a very simple form of household mouse trap of the impalement type. One of the main objections to these traps is the danger of getting one's fingers painfully rapped by the spring jaw in the process of setting the trap. The only practical way to avoid this is by means of some securing device which will project into the path of some movable part, for instance the jaw, while the trap is being set, so as to prevent the jaw from snapping shut under the action of its spring while the bait holder is being engaged by the trigger bar to set the trap. According to the present invention, this comprises a member 1 movably mounted on a suitable support 2 and adapted to engage the jaw 3 when in open position, and hold it so. In the two forms shown this member 1 is mounted to slide through suitable guide staples 4 on the support 2, and is bent to substantially U form at one end to provide an arm 5 spaced from the rest of the member 1 and in position to be engaged over the depressed jaw 3, as in Fig. 2. The opposite end of the member 1, preferably, is bent over, as at 6, to engage the edge of the support 2 and limit the sliding movement of member 1 in one direction, the U of the other end limiting it in the opposite direction, as will be obvious. It is advisable, of course, to have part 5 at all times above the support 2 so that it will be in the best position to be drawn above jaw 3 when the jaw is swung back. To this end, the member 1 is provided with oppositely directed offsets 7, or similar means, to engage the support 2 and maintain the part 5 in such preliminary position by preventing rotation about its longitudinal axis. Or, as shown by the corresponding member 10 in Figs. 3 and 4, it may be made in bar or plate form—flat and comparatively wide—instead of as a round rod, as in the other views. Such construction will accomplish the same result equally well, and is somewhat simpler. Also, in the form shown in Figs. 3 and 4, it will be noticed that the member 1, between its ends, has a gradual curvature, the convex side of which engages the support 2, while the concave part engages the staples 4. The curvature is sufficient to cause a slight binding engagement or frictional hold between member 1, support 2, and staples 4 in all positions, so that there is no danger of the part 5 accidentally slipping from jaw 3 when engaged therewith in the locking position, or accidentally slipping to a position to intercept it when free therefrom and in the released position.

In using the device in setting the trap, simply swing the spring jaw 3 back against the tension of spring 8, as usual. Then draw the catch toward the right from the preliminary to the full line or operative position of Fig. 2. In that position, if the jaw escapes from the hand, it will immediately be engaged by the part 5 extending directly above one side of it, locking it, as will be evident. Now swing the trigger bar 9 across the jaw and engage it beneath the rear edge of the bait holder 11 in the usual way. The parts will then be in the full line position of Fig. 2. Now, slide member 1 in the opposite direction so that the parts will be clear of the path of jaw 3 in its upward swing as the trap is set off.

Preferably, the part 5 is so spaced from the rest of member 1 as to provide a slight space between jaw 3 and part 5 when the trap is in set position, as indicated by dotted lines in Fig. 2. This avoids any possible movement of jaw 3 by the member 1 as member 1 is slid to inoperative position after setting the trap.

Also, the fact that, when the trap is set, there is an appreciable interval between the part 5 and the plane of the jaw will provide a visual signal or indication as to the condition of the trap, that is, whether it is set or sprung, as the part into the path of which part 5 projects will be spaced appreciably from part 5 when the trap is set, whereas it will bear against part 5 when the trap is accidentally sprung while part 5 is in operative position, so that it is always possible to positively determine at a glance if the trap is set before moving the safety catch to inoperative position.

It is clear that many structural changes may be made without in any way departing from the field and scope of the invention, and it is meant to include all such within this application within the scope of the appended claims.

Having thus described my invention, what I claim and desire to secure by Letters Patent is:

1. A trap catch comprising a support, a member movably mounted thereon and adapted to extend above and engage a trap jaw, and means for limiting the movement of said catch, said member being normally out of contact with said trap jaw when in operative position.

2. A trap catch comprising a support, a member movably mounted thereon and adapted to engage a trap jaw, means for preventing rotation of said catch about its longitudinal axis, and means for resiliently holding said catch in adjusted positions.

3. A trap catch comprising a support, a member movably mounted thereon and adapted to engage a trap jaw, means for preventing rotation of said catch about its longitudinal axis, means for limiting longitudinal movement of said catch, and means for frictionally holding said catch in adjusted positions.

4. A trap catch comprising a support with suitable guiding elements, and a bar slidably mounted in said elements and adapted to engage a trap jaw and provided with a curved portion adapted to frictionally engage said support to hold said catch in adjusted positions.

In testimony whereof, I have signed my name to this specification in the presence of two subscribing witnesses.

THOMAS LAURENCE MUNROE.

Witnesses:
RALPH W. REYNOLDS,
JOHN T. SWIFT.